Dec. 17, 1963 N. A. SCHUSTER 3,114,876
MAGNETIC ANOMALY DETECTION APPARATUS WITH PERMANENT MAGNET MEANS
Filed April 6, 1959 3 Sheets-Sheet 1
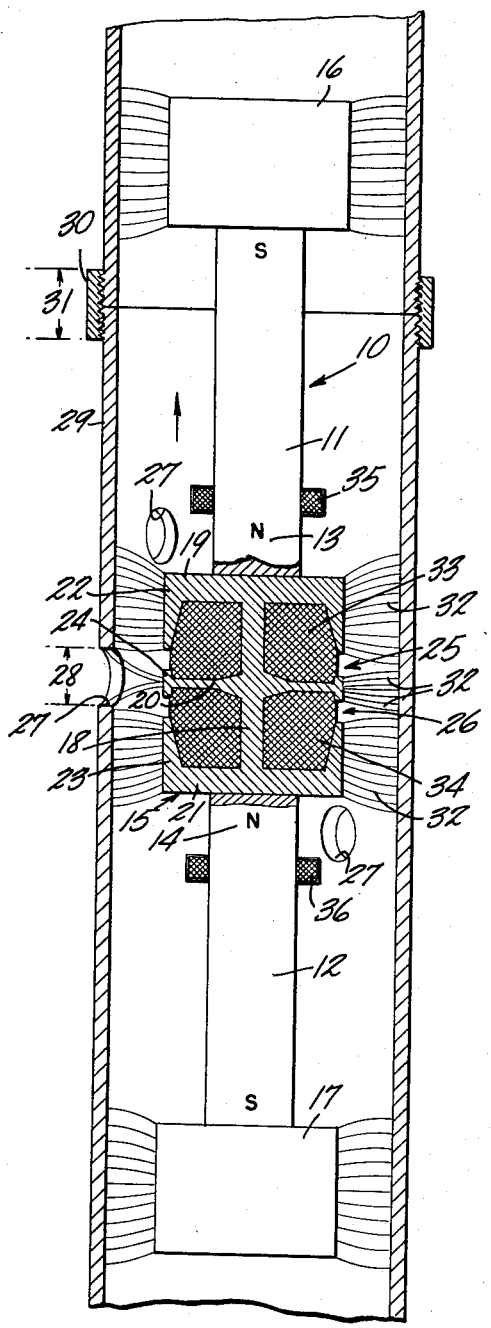
FIG. 1.
FIG. 2.
INVENTOR.
NICK A. SCHUSTER
BY 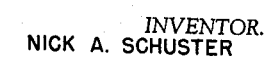
his ATTORNEYS Dec. 17, 1963 N. A. SCHUSTER 3,114,876
MAGNETIC ANOMALY DETECTION APPARATUS WITH PERMANENT MAGNET MEANS
Filed April 6, 1959 3 Sheets-Sheet 2

INVENTOR.
NICK A. SCHUSTER
BY
Brumbaugh, Free, Graves & Donohue
his ATTORNEYS

United States Patent Office 3,114,876
Patented Dec. 17, 1963

3,114,876
MAGNETIC ANOMALY DETECTION APPARATUS WITH PERMANENT MAGNET MEANS
Nick A. Schuster, Houston, Tex., assignor to Schlumberger Well Surveying Corporation, Houston, Tex., a corporation of Texas
Filed Apr. 6, 1959, Ser. No. 804,490
15 Claims. (Cl. 324—34)

This invention relates to devices for detecting magnetic anomalies and, more particularly, to a new and improved magnetic detection apparatus especially adapted to detect magnetic anomalies of characteristic size.

In surveying a well or borehole, for example, it is often important to determine the location of perforated zones where projectiles have been fired through the borehole casing, thereby producing magnetic anomalies. Various forms of devices for detecting magnetic anomalies at casing collar locations are known but these usually are not sensitive enough to detect casing perforation zones since the magnetic anomaly produced by a projectile perforation is restricted to a small area relative to that at a casing collar extending completely around the borehole casing. Furthermore, inasmuch as apparatus for detecting perforated zones in a casing usually is contained in the same instrument with a perforating gun, it is desirable to make the apparatus independent of electrical power to avoid unintentional firing of the gun.

Accordingly, it is an object of this invention to provide magnetic detection apparatus capable of detecting magnetic anomalies of predetermined size.

Another object of the invention is to provide magnetic apparatus for detecting perforations in a borehole casing.

A further object of the invention is to provide magnetic detection apparatus for use in a borehole which is less sensitive to lateral motion of the entire apparatus with respect to the wall of the borehole.

An additional object of the invention is to provide apparatus of the above character which is independent of electrical power.

These and other objects of the invention are attained by providing a magnet with a pole piece including a plurality of pole faces and a plurality of coil windings. The pole piece is formed to direct magnetic flux from all the pole faces in substantially parallel directions, the pole faces being spaced by a distance approximately equal to the characteristic size of the anomalies to be detected. Each coil encircles the portion of the pole piece between adjacent pole faces and adjacent coil windings are connected in opposed relation so that for a given direction of flux through the coils any change in such flux will generate opposite polarity voltage signals in the adjacent coil windings.

Further objects and advantages of the invention will be apparent from a reading of the following description in conjunction with the accompanying drawings in which:

FIG. 1 is a view in elevation, partly in section, illustrating a representative magnetic detection device suspended in a borehole casing;

FIG. 2 is a schematic circuit diagram showing the connection of the coil windings in the apparatus of FIG. 1;

Figure 3:
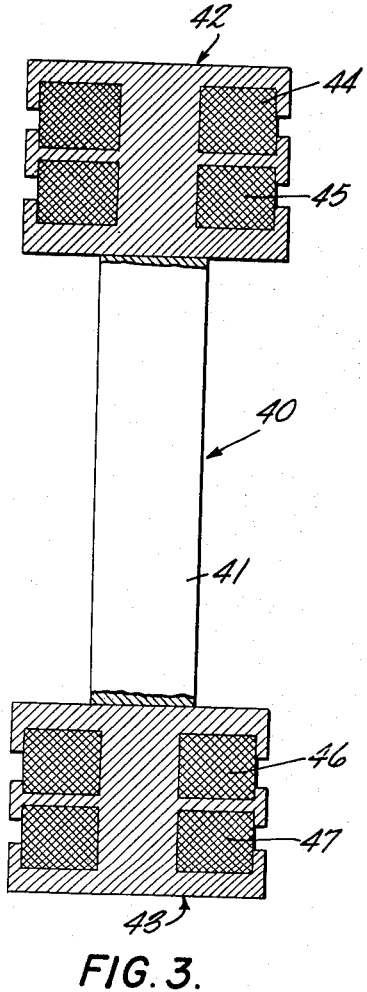
FIG. 3 illustrates another form of magnetic detection apparatus according to the invention.

In the typical embodiment of the invention shown in FIG. 1, the magnetic detection apparatus 10 comprises a pair of coaxial permanent magnets 11 and 12 having like poles 13 and 14 affixed to a common central pole piece 15. The pole piece 15 is made of ferro-magnetic material, such as iron, and preferably has a cylindrical shape when the apparatus is used to survey borehole casings. Also, each of the magnets 11 and 12 carries another cylindrical ferro-magnetic pole piece 16 and 17 of similar diameter at its outer end. If desired, the entire apparatus 10 may be enclosed in a suitable housing of non-magnetic material (not shown).

Within the pole piece 15 a longitudinal center member 18 extends between the poles 13 and 14 and joins three pole face members in the form of three spaced annular portions 19, 20 and 21, the end portions 19 and 21 being adjacent the poles 13 and 14 and terminating in peripheral pole faces 22 and 23, respectively. In a similar manner, the central annular portion 20 carries a peripheral pole face 24 and this is positioned halfway between the faces 22 and 23 leaving two peripheral gaps 25 and 26 in the cylindrical surface of the pole piece 15.

In order to more effectively detect magnetic anomalies in an object having a characteristic size by relative motion of the apparatus 10 as described hereinafter, the center-to-center spacing between adjacent ones of the pole faces 22, 23 and 24 should be approximately equal to the characteristic size of the anomalies as measured in the direction of motion of the apparatus. Thus, for example, if perforations 27 having a diameter 28 in a borehole casing 29 are to be detected, the spacing of the pole faces should be approximately equal to the distance 28. Similarly, improved detection of a casing collar 30 is obtained by making this spacing approximately the same dimension as the width 31 of the collar, since the added material of the collar provides the magnetic anomaly in this case. Also, for this embodiment, the spacing between the inner edges of the outer pole faces 22 and 23 should be approximately equal to the characteristic size of the anomalies of interest.

As illustrated in FIG. 1, the magnetic circuit for each of the magnets 11 and 12 is completed through a portion of the adjacent casing 29 so that magnetic anomalies in the vicinity of the central pole piece 15 affect the proportion of magnetic flux 32 from each magnet which is carried through the central member 18 and the annular portion 20. Thus, one path of the magnetic circuit for the magnet 11, for example, leads through the annular portion 19 and the pole face 22 to the casing 29 while another path follows the central member 18 and the pole face 24 to the casing, both paths being completed through the casing and the end pole 16 to the opposite end of the magnet. Accordingly, the character of the part of the casing 29 adjacent the pole faces 22 and 24 determines the proportion of the flux 32 from the magnet 11 which passes through the annular portion 20 of the central pole piece 15.

Furthermore, because of the like polarity of the poles 13 and 14 adjacent the pole piece 15 and because of the relatively low internal reluctance of the material forming the pole piece 15, the pole piece 15 is maintained at nearly a constant magnetic potential. Consequently, the lines of magnetic flux 32 extend in substantially parallel directions from the pole faces 22, 23 and 24, as indicated in the drawing. Thus, the magnetic flux from the central pole face 24 is confined to a desired lateral flow path by the additional magnetic flux emitted above and below this point by the outer pole faces 22 and 23. As a result of this focusing effect, magnetic anomalies need not be immediately in front of pole face 24 to affect the amount of flux emitted therefrom but may be spaced therefrom by an appreciable lateral distance. This is important because the borehole and, hence, the casing 29 will frequently be inclined at an angle relative to a true vertical which, in turn, means that the detection apparatus 10 as a whole will frequently be lying against one side of the casing 29. Therefore, inasmuch as the usual perforating gun fires projectiles through the borehole casing in four directions at 90° angles, a detector moving close to one side of the casing will detect at least two and usually three of the perforations, thus indicating the perforated zone in the desired manner. In other words, perforations 27 in a borehole casing 29 can be detected even though the apparatus 10 does not pass directly over them.

Between the end portion 19 and the center portion 20 of the pole piece 15, a coil winding 33 encircles the longitudinal center member 18 thus enclosing magnetic flux from the magnet 11 which passes out through the pole face 24. Similarly, another coil winding 34 encircles the member 18 between the annular portions 20 and 21 thereby responding to changes in flux from the magnet 12 passing out through the annular portion 20. In addition, two other coil windings 35 and 36 encircle the magnets 11 and 12, respectively, and these preferably have about ⅓ the number of turns as the windings 33 and 34.

As illustrated in the circuit diagram of FIG. 2, the windings 33 and 34 are connected in series in opposed relation so that for a given direction of flux through the coil windings the corresponding voltage signals generated by a change in the flux will be of opposite polarity. This opposed relation may be obtained by winding the two coils 33 and 34 around the center member 18 in opposite directions and then interconnecting the adjacent ends of the two coils. Also, the windings 35 and 36 are connected in series and in opposed relation to the corresponding windings 33 and 34, respectively. The electrical circuit is completed through two conductors 37 and 38 which lead to a voltage indicating or recording device such as a conventional galvanometer (not shown).

In operation, as the magnetic detecting apparatus 10 is moved longitudinally through the borehole casing 29, for example, in the upward direction as indicated by the arrow, a magnetic anomaly such as a perforation 27 influences the flux 32 passing outwardly from the pole faces 22, 24 and 23, in sequence. Assuming that coil windings 33 and 36 are wound with a positive polarity and that flux components passing through magnets 11 and 12 and center member 18 in a downward direction are of positive polarity, while windings 34 and 35 and flux components passing in an upward direction are of negative polarity, and further assuming that the center two windings 33 and 34 have three times as many turns as the outer windings 35 and 36, then an approximate determination may be made of the signal components generated in the various windings for the different cases where the magnetic anomaly is in front of different ones of the pole faces 22, 24 and 23.

Thus, when the magnetic anomaly represented by perforation 27 starts to move in front of pole face 22, the increased reluctance between this pole face and the casing 29 causes a reduction in the flux components normally passing through this pole face. Noting that the upper magnet 11 produces downward flux components through the center member 18 while the lower magnet 12 produces upward flux components, then this reduction in flux components through pole face 22 is seen to produce a voltage component of minus one unit in winding 35 as a result of the decrease in downward flux through this winding. At the same time, voltage components of minus one, plus three and minus three units are produced in windings 36, 34 and 33, respectively, because of the decrease in upward flux components. These voltage components thus provide a net voltage signal of approximately minus two units across the two output conductors 37 and 38.

As the perforation 27 moves away from pole face 22, the flux components passing therethrough begin to increase back to their original values. This represents a reversal in direction of the flux change and, consequently, produces a net voltage signal of approximately plus two units. Thus, the net voltage signal is in the form of one cycle of a sine wave with a peak amplitude of two units.

Similar considerations show that as the perforation 27 passes by the center pole face 24, the voltage signal generated is in the form of another sine wave cycle but, because of the polarity and number of turns on the windings linked by the affected flux components, this voltage signal first goes positive and then negative, in both cases with a peak amplitude of approximately four units. As the perforation 27 subsequently passes the lower pole face 23, a voltage cycle like that for upper pole face 22 is generated, that is, the voltage signal first goes negative and then positive, in both cases with a peak amplitude of two units.

The above explanation has assumed that the flux components from only one pole face at a time are affected. In practice, however, the anomaly will often begin to affect the flux from the next pole face before it has finished with the previous pole face. Consequently, the voltage cycles will be run together to form a series of positive and negative half cycles, it being noted that the half cycle produced as the anomaly leaves one pole face will be of the same polarity as the half cycle produced as the anomaly approaches the next pole face. In this case, then, the voltage signal will appear to have a number of half cycles equal to the number of coils with the half cycle portions produced when the anomaly is in the vicinity of the center of the coil winding array being of greater amplitude. Accordingly, as a result of longitudinal motion of the apparatus past a perforation 27, a substantial voltage signal is transmitted by the conductors 37 and 38 for detection by an indicator or recorder.

Because of the proper choice of the relative number of turns on the various coil windings, namely, approximately one-three-three-one for the four-coil case of this embodiment, any sidewise or lateral movement of the apparatus 10 as a whole with respect to the wall of the casing 29 will produce voltage components which combine to produce a net output signal of zero volts. In a similar manner, no net output signal will be produced as the end pole pieces 16 and 17 move longitudinally past an anomaly. Consequently, any sidewise movement of the pole piece 16 relative to the pole piece 17 will also tend to produce no net output signal, though the cancellation of voltage components will be less perfect for this type of movement. It is seen, therefore, that the magnetic detection apparatus of the present invention provides a relatively strong signal in response to longitudinal movement past an anomaly while, at the same time, providing a minimum of response to extraneous movements of the apparatus. Thus, this apparatus provides a relatively high signal-to-noise ratio. However, inasmuch as the change in flux through the coils 33 and 34 resulting from lateral motion of the apparatus with respect to the casing 29 varies in a somewhat different manner than the change in flux linking the coils 35 and 36, the cancellation of signals gneerated in the coils by such lateral motion is not always complete.

Figure 4:
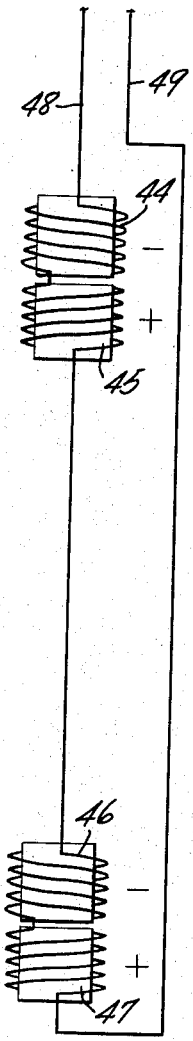
FIG. 4 is a schematic circuit diagram of the device shown in FIG. 3.

Accordingly, if substantially complete cancellation of these signals is desired, the compensating coil windings should be identical to the detecting windings as in the arrangement shown in FIGS. 3 and 4. In this embodiment of the invention, the detecting apparatus 40 comprises a permanent magnet 41 and two identical pole pieces 42 and 43 similar to the pole piece 15 of FIG. 1, disposed at opposite ends of the magnet 41. Each pole piece includes two like coil windings 44, 45 and 46, 47 and these are connected in series, with the coils in each pole piece joined in opposed relation, as shown in FIG. 4. Also, the circuit is arranged so that the windings 45 and 46 adjacent the poles of the magnet 41 are connected in opposed relation, the series of windings being linked to a galvanometer through two conductors 48 and 49.

In operation, as each of the pole pieces 42 and 43 is moved past a perforation, the flux changes generate voltage signals in the two windings of the pole piece in much the same manner as in the previously described embodiment, the lines of flux from the center pole face of each pole piece being focused radially outwardly by the adjacent faces of like polarity in the pole piece. Inasmuch as the other pole piece is largely unaffected, these voltage signals are applied through the conductors 48 and 49 to energize the indicating or recording device. Any variation in flux resulting from lateral motion of the apparatus with respect to the casing affects the windings 45 and 46 adjacent the magnet 41 equally, producing identical signals of opposite voltage since these windings are in opposed relation. Similarly, changes in flux through the windings 44 and 47 resulting from lateral motion produce equal and opposite voltage signals which cancel. Accordingly, undesired voltage signals are substantially eliminated by this embodiment of the invention.

Inasmuch as the voltage signal induced in the windings of the above described embodiments by relative motion of the apparatus with respect to a perforation consists of positive and negative half cycles or pulses in close succession and since the amplitude and spacing of these pulses both depend on the rate of motion of the apparatus, certain types of galvanometers may not respond quickly enough to detect these rapid changes in voltage. Accordingly, the embodiment of the invention shown in FIGS. 5 and 6 is designed to overcome this disadvantage by generating an extended sequence of pulses in response to relative motion with respect to each perforation.

Figure 5:
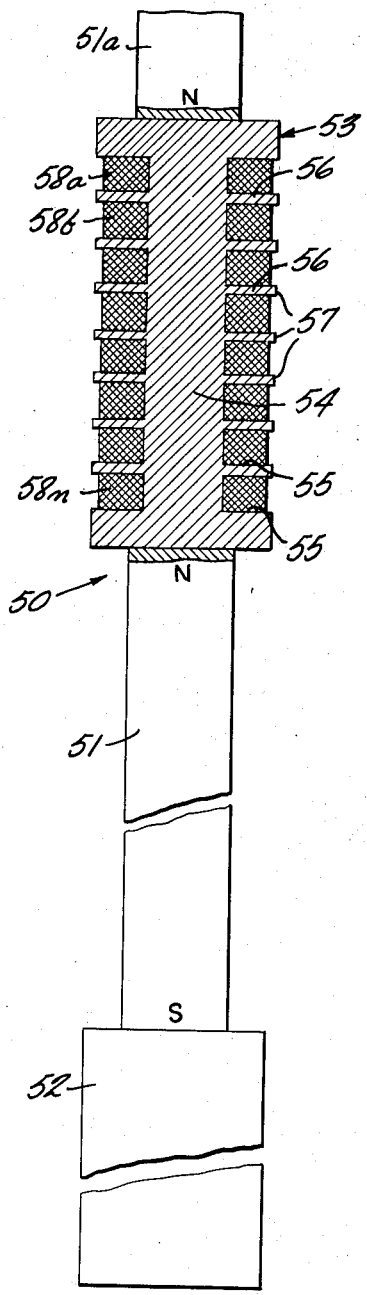
FIG. 5 illustrates another embodiment of the invention.
Figure 6:
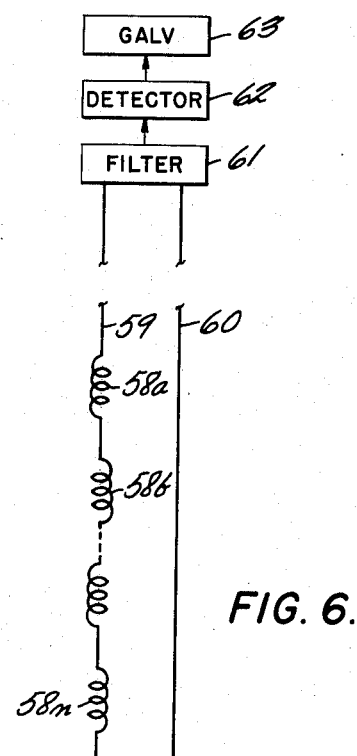
FIG. 6 shows schematically the circuit of the coil windings of FIG. 5.

As illustrated in FIG. 5, a detecting device 50 according to this embodiment of the invention comprises a permanent magnet 51 having two pole pieces 52 and 53 affixed to opposite ends of the magnet. Both the pole pieces 52 and 53 are cylindrical in shape and are formed of any suitable magnetic material, the pole piece 53 at one end being formed with a plurality of annular recesses 55. These recesses are formed by radial pole face members or dividers 56 longitudinally spaced along the central core 54 at uniform intervals approximately equal to the width 28 of a perforation 27 (FIG. 1) and terminating in peripheral pole faces 57. Inasmuch as the entire pole piece 53 is at substantially the same magnetic potential, the magnetic flux from all the pole faces 57 is directed radially outwardly in substantially parallel directions, thereby enabling the apparatus to detect perforations at appreciable lateral distances in the manner described above. If desired, another magnet 51a carrying a pole piece (not shown) similar to the pole piece 52 can be positioned against the pole piece 53 with its adjacent pole opposed to the adjacent pole of the magnet 51.

In order to detect flux changes in the pole piece 53, a plurality of coil windings 58a—58n is included in the pole piece, one winding being positioned in each recess 55 and encircling the central core 54. As shown in FIG. 6, the windings of the group 58a—58n are connected in series and adjacent windings are joined in opposed relation so that for a given direction through the windings any change in flux will produce opposite polarity voltage signals in adjacent windings. In order to provide cancellation of voltage components for undesired sidewise or lateral movements of the apparatus 50, the coil windings 58a—58n may, for the case of eight coils, have a number of turns sequence of 3–5–3–5–5–3–5–3 turns, or any multiple or submultiple thereof. The number of turns sequence for any given number of coils is determined by writing the equation for the total voltage signal in terms of the algebraic sum of the various flux components and the coils which link each component and then setting this sum equal to zero. Any combination of coil turns which satisfies this equation represents a combination which will produce the desired voltage component cancellation. Thus, for any given number of coils, there may be more than one possible solution.

Two conductors 59 and 60 carry voltage signals from the windings through a filter 61 to a conventional detector 62 and galvanometer 63. If desired, the detector 62 may include suitable A.C. amplifying equipment. Also, the filter 61 may be arranged to pass a range of A.C. signal frequencies corresponding to the rates at which the pole faces 57 pass a casing perforation at the expected range of borehole logging speeds. Preferably, however, the filter is arranged to pass a narrow band or a single frequency corresponding to the frequency of pulses generated at a specific logging speed to be used.

In operation, since the pole faces 57 are spaced by a distance about equal to the size of a casing perforation, primarily only the flux through one pole face at a time is influenced by the perforation. Thus, when the apparatus 50 is moved longitudinally through a casing adjacent the perforation, the flux from each pole face is first reduced and then increased back to its original value, in sequence, thus producing a sinusoidal-type voltage cycle for each pole face. As before, these cycles will usually overlap to produce a resultant signal having a series of positive and negative half cycles equal in number to the number of coil windings used. Lateral motion of the apparatus with respect to the casing, however, produces flux changes which result in substantially no net voltage signal being produced. In this manner, the passage of a perforation along the pole piece 53 generates an alternating current signal having a frequency proportional to the rate of motion. This signal is transmitted by the conductors 59 and 60 to the filter 61 which is selected to pass signals at this frequency and reject other frequencies and activates the detector 62 to energize the indicating galvanometer 63.

Although the invention has been described herein with reference to specific embodiments, many modifications and variations therein will readily occur to those skilled in the art. Accordingly, all such variations and modifications are included within the intended scope of the invention as defined by the following claims.

I claim:

1. Apparatus for detecting magnetic anomalies in an object comprising magnet means generating a flux field passing through the object, pole piece means at one pole of the magnet means having elements providing at least two magnetic flux paths between that pole of the magnet means and the object, and at least two coils in the pole piece means linking the magnetic flux passing through elements providing different ones of the paths and connected in opposed relation.

2. Apparatus for detecting magnetic anomalies in an object comprising magnet means generating a flux field passing through the object, pole piece means at one pole of the magnet means having elements providing at least two magnetic flux paths between that pole of the magnet means and the object and shaped to direct the flux in the paths in substantially parallel direction toward the object, and at least two coils in the pole piece means linking the magnetic flux passing through elements providing different ones of the paths and connected in opposed relation.

3. Apparatus for detecting magnetic anomalies of characteristic size in an object comprising magnet means generating a flux field passing through the object, pole piece means at one pole of the magnet means having elements providing at least two magnetic flux paths between that pole of the magnet means and the object having portions spaced by a distance approximately equal to the characteristic size of the anomaly, and at least two coils in the pole piece means linking the magnetic flux passing through elements providing different ones of the paths and connected in opposed relation.

4. Apparatus for detecting magnetic anomalies in an object comprising a pair of opposed magnet means generating a flux field passing through the object, pole piece means positioned between adjacent like poles of the pair of magnet means and the object having elements providing at least two magnetic flux paths, and at least two coils linking a portion of the magnetic flux passing through elements providing different ones of the paths and connected in opposed relation.

5. Apparatus for detecting magnetic anomalies of characteristic size in an object comprising a pair of opposed magnet means each generating a flux field passing through the object, pole piece means positioned between adjacent like poles of the pair of magnet means and the object having elements providing at least two magnetic flux paths having portions intermediate the pole piece means and the object spaced by a distance approximately equal to the characteristic size of the anomaly, at least two coils linking the magnetic flux passing through elements providing different ones of the paths and connected in opposed relation, at least two additional coils linking substantially all of the flux of different ones of the magnet means and connected in opposed relation, and means interconnecting these additional coils with the first-mentioned coils.

6. Apparatus for detecting magnetic anomalies of characteristic size in an object comprising a pair of opposed magnet means each generating a flux field passing through the object, common pole piece means positioned between adjacent like poles of the magnet means and the object providing three magnetic flux paths having substantially parallel portions intermediate the pole piece means and the object spaced by a distance approximately equal to the characteristic size of the anomaly, two coils connected in opposed relation individually linking the magnetic flux from a different one of the magnet means passing through one of the paths, two additional coils connected in opposed relation individually linking substantially all of the flux of a different one of the magnet means, and means interconnecting these additional coils with the first-mentioned coils.

7. Apparatus for detecting magnetic anomalies of characteristic size in an object comprising a pair of opposed permanent magnets, a common pole piece positioned between adjacent like poles of the permanent magnets having three pole faces directing substantially parallel paths of magnetic flux toward the object, one central pole face being spaced from the other two by a distance approximately equal to the characteristic size of the anomaly and providing a path for magnetic flux from both magnets, two coil windings linking the flux from each magnet respectively passing through the central pole face and connected in opposed relation, and two additional coil windings linking substantially all of the flux of different ones of the magnets and connected in opposed relation to the corresponding one of the first-mentioned coil windings.

8. Apparatus for detecting magnetic anomalies of characteristic size in an object comprising permanent magnet means generating a flux field passing through the object, pole piece means at each pole of the magnet means having elements providing at least two magnetic flux paths between the corresponding pole and the object, portions of the pole piece means being spaced by a distance dependent upon the characteristic size of the anomaly, and at least two coils secured to each pole piece means and linking the magnetic flux passing through elements providing different ones of the paths in each pole piece and connected in opposed relation.

9. Apparatus for detecting magnetic anomalies of characteristic size in an object comprising permanent magnet means generating a flux field passing through the object, pole piece means at each pole of the magnet means having elements providing at least two magnetic flux paths between the corresponding pole and the object, means directing the paths from each pole in substantially parallel portions intermediate the pole piece means and the object, said means being spaced by a distance dependent upon the characteristic size of the anomaly, and at least two coils secured to each pole piece means and linking the magnetic flux passing through elements providing different ones of the paths in each pole piece and connected in opposed relation, the corresponding coils in the two pole pieces being connected in opposed relation.

10. Apparatus for detecting magnetic anomalies of characteristic size in an object comprising a permanent magnet generating a flux field passing through the object, a pole piece at each pole of the magnet having at least two pole faces directing substantially parallel paths of magnetic flux toward the object, portions of the pole piece means being spaced by a distance dependent upon the characteristic size of the anomaly, and two coil windings secured to each pole piece means and linking the flux passing through different ones of the pole faces in each pole piece and connected in opposed relation, the corresponding coil windings in the two pole pieces being connected in opposed relation.

11. Apparatus for detecting magnetic anomalies of characteristic size in an object comprising magnet means generating a flux field passing through the object, pole piece means at one pole of the magnet means providing a plurality of magnetic flux paths between that pole of the magnet means and the object, and a plurality of coils each in the pole piece means linking at least a portion of the magnetic flux through a corresponding flux path, the coils corresponding to adjacent paths being connected in opposed relation.

12. Apparatus for detecting magnetic anomalies of characteristic size in an object comprising permanent magnet means generating a flux field passing through the object, pole piece means providing a plurality of magnetic flux paths between the magnet means and the object, means directing the flux paths in substantially parallel portions intermediate the pole piece means and the object, said directing means being spaced by a distance dependent upon the characteristic size of the anomaly, a plurality of coils each linking at least a portion of the magnetic flux through a corresponding flux path, the coils corresponding to adjacent paths being connected in opposed relation, and alternating-current filter means connected to the plurality of coils passing a selected range of alternating-current frequencies corresponding to the frequencies of signals generated by the plurality of coils in response to relative motion of the pole piece means past a magnetic anomaly within a predetermined range of velocities.

13. Apparatus for detecting magnetic anomalies of characteristic size in an object comprising a permanent magnet generating a flux field passing through the object, a pole piece adjacent one pole of the magnet having a plurality of pole faces spaced by a distance approximately equal to the characteristic size of the anomaly and providing a plurality of substantially parallel magnetic flux paths directed toward the object, a plurality of coil windings each linking a portion of the magnetic flux passing through a corresponding pole face, circuit means connecting the windings corresponding to adjacent pole faces in opposed relation, and alternating-current filter means connected to the coil circuit means for passing a selected range of alternating-current frequencies corresponding to the frequencies of signals generated by the plurality of windings in response to relative motion of the pole piece past a magnetic anomaly within a predetermined range of frequencies.

14. Apparatus for detecting magnetic anomalies in a cased borehole comprising an elongated magnetic core adapted for movement through the borehole and having at least three pole face members projecting therefrom at longitudinally spaced intervals therealong, a plurality of coils individually encircling the magnetic core intermediate different pairs of adjacent pole face members, and a permanent magnet having a pole face thereof secured to one end of the magnetic core.

15. Apparatus for detecting magnetic anomalies in an elongated borehole casing comprising magnet means for generating magnetic flux and adapted for movement through the borehole casing, pole piece means secured to the magnet means and having a first face portion for directing a first portion of the magnetic flux towards the casing and a second face portion spaced longitudinally therefrom for directing additional magnetic flux adjacent to the first flux for confining the first flux to a desired lateral flow path intermediate the pole piece means and the casing, and coil means linking the flux supplied to the first face portion for providing an output indication of any magnetic anomalies in the vicinity thereof.

References Cited in the file of this patent

UNITED STATES PATENTS

| | | |
|---|---|---|
| 2,558,427 | Fagan | June 26, 1951 |
| 2,869,072 | Gieske | Jan. 13, 1959 |
| 2,964,699 | Perriam et al. | Dec. 13, 1960 |
| 2,967,994 | Peterson | Jan. 10, 1961 |
| 3,007,109 | Swift | Oct. 31, 1961 |